(12) United States Patent
Tam et al.

(10) Patent No.: US 11,647,352 B2
(45) Date of Patent: May 9, 2023

(54) HEAD TO HEADSET ROTATION TRANSFORM ESTIMATION FOR HEAD POSE TRACKING IN SPATIAL AUDIO APPLICATIONS

(71) Applicant: Apple Inc., Cupertino, CA (US)

(72) Inventors: Margaret H. Tam, San Jose, CA (US); Xiaoyuan Tu, Sunnyvale, CA (US); Alexander Singh Alvarado, San Jose, CA (US); Adam S. Howell, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/349,907

(22) Filed: Jun. 16, 2021

(65) Prior Publication Data

US 2021/0400418 A1 Dec. 23, 2021

Related U.S. Application Data

(60) Provisional application No. 63/041,909, filed on Jun. 20, 2020.

(51) Int. Cl.
| | |
|---|---|
| *H04S 7/00* | (2006.01) |
| *H04R 5/033* | (2006.01) |
| *H04S 3/00* | (2006.01) |
| *G06F 3/01* | (2006.01) |
| *G06F 3/0346* | (2013.01) |
| *G06V 40/16* | (2022.01) |
| *H04R 1/10* | (2006.01) |
| *G01C 21/18* | (2006.01) |
| *H04M 1/05* | (2006.01) |

(52) U.S. Cl.
CPC ............ *H04S 7/304* (2013.01); *H04R 5/033* (2013.01); *H04S 3/004* (2013.01); *H04S 3/008* (2013.01); *H04S 2400/01* (2013.01); *H04S 2400/11* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 9,459,692 B1 * | 10/2016 | Li ........................... G06T 7/248 |
| 10,339,078 B2 | 7/2019 | Nair et al. |
| 2005/0281410 A1 * | 12/2005 | Grosvenor ............. H04H 60/47 |
| | | | 381/61 |
| 2014/0153751 A1 | 6/2014 | Wells |

(Continued)

*Primary Examiner* — Qin Zhu
(74) *Attorney, Agent, or Firm* — Fish & Richardson P.C.

(57) ABSTRACT

In an embodiment, a method comprises: estimating a first gravity direction in a source device reference frame for a source device; estimating a second gravity direction in a headset reference frame for a headset; estimating a rotation transform from the headset frame into a face reference frame using the first and second estimated gravity directions, a rotation transform from a camera reference frame to the source device reference frame, and a rotation transform from the face reference frame to the camera reference frame; estimating a relative position and attitude using source device motion data, headset motion data and the rotation transform from the headset frame to the face reference frame; using the relative position and attitude to estimate a head pose; and using the estimated head pose to render spatial audio for playback on the headset.

14 Claims, 8 Drawing Sheets

(56) References Cited

U.S. PATENT DOCUMENTS

| | | |
|---|---|---|
| 2016/0119731 A1 | 4/2016 | Lester, III |
| 2016/0269849 A1 | 9/2016 | Riggs et al. |
| 2017/0295446 A1 | 10/2017 | Thagadur Shivappa |
| 2018/0091923 A1 | 3/2018 | Satongar et al. |
| 2018/0220253 A1 | 8/2018 | Kärkkäine et al. |
| 2019/0313201 A1 | 10/2019 | Torres et al. |
| 2019/0379995 A1 | 12/2019 | Lee et al. |
| 2020/0037097 A1 | 1/2020 | Torres et al. |
| 2020/0059749 A1 | 2/2020 | Casimiro Ericsson et al. |
| 2020/0169828 A1 | 5/2020 | Liu et al. |
| 2021/0211825 A1* | 7/2021 | Joyner .................. H04S 7/301 |
| 2021/0396779 A1 | 12/2021 | Sarathy et al. |
| 2021/0397249 A1 | 12/2021 | Kriminger et al. |
| 2021/0397250 A1 | 12/2021 | Akgul et al. |
| 2021/0400414 A1 | 12/2021 | Tu et al. |
| 2021/0400419 A1 | 12/2021 | Turgut et al. |
| 2021/0400420 A1 | 12/2021 | Tam et al. |
| 2022/0103964 A1 | 3/2022 | Tu et al. |
| 2022/0103965 A1 | 3/2022 | Tu et al. |

\* cited by examiner

HEAD TO HEADSET ROTATION TRANSFORM ESTIMATION FOR HEAD POSE TRACKING IN SPATIAL AUDIO APPLICATIONS

CROSS-REFERENCE TO RELATED APPLICATION

This application claims priority to U.S. Provisional Patent Application No. 63/041,909, filed Jun. 20, 2020, the entire contents of which are incorporated herein by reference.

TECHNICAL FIELD

This disclosure relates generally to spatial audio applications.

BACKGROUND

Spatial audio creates a three-dimensional (3D) virtual auditory space that allows a user wearing a headset to pinpoint where a sound source is located in the 3D virtual auditory space, while watching a movie, playing a video game or interacting with augmented reality (AR) content displayed on a source device (e.g., a computer screen). Existing spatial audio platforms include a head pose tracker that uses a video camera to track the head pose of the user. If the source device is a mobile device (e.g., smartphone, tablet computer), then the source device and the headset are free to move relative to each other, which may adversely impact the user's perception of the 3D spatial audio.

SUMMARY

Embodiments are disclosed for estimating a head to headset rotation transform for head pose tracking in spatial audio applications. In an embodiment, a method comprises: estimating a first gravity direction in a source device reference frame for a source device; estimating a second gravity direction in a headset reference frame for a headset; estimating a rotation transform from the headset frame into a face reference frame using the first and second estimated gravity directions, a rotation transform from a camera reference frame to the source device reference frame, and a rotation transform from the face reference frame to the camera reference frame; estimating a relative position and attitude using source device motion data, headset motion data and the rotation transform from the headset frame to the face reference frame; using the relative position and attitude to estimate a head pose; and using the estimated head pose to render spatial audio for playback on the headset.

Other embodiments can include an apparatus, computing device and non-transitory, computer-readable storage medium.

Particular embodiments disclosed herein provide one or more of the following advantages. A user can perceive spatial audio while wearing their headset at different positions on their head, such as tilted forward or backward.

The details of one or more implementations of the subject matter are set forth in the accompanying drawings and the description below. Other features, aspects and advantages of the subject matter will become apparent from the description, the drawings and the claims.

DETAILED DESCRIPTION

Example Systems

Figure 1:
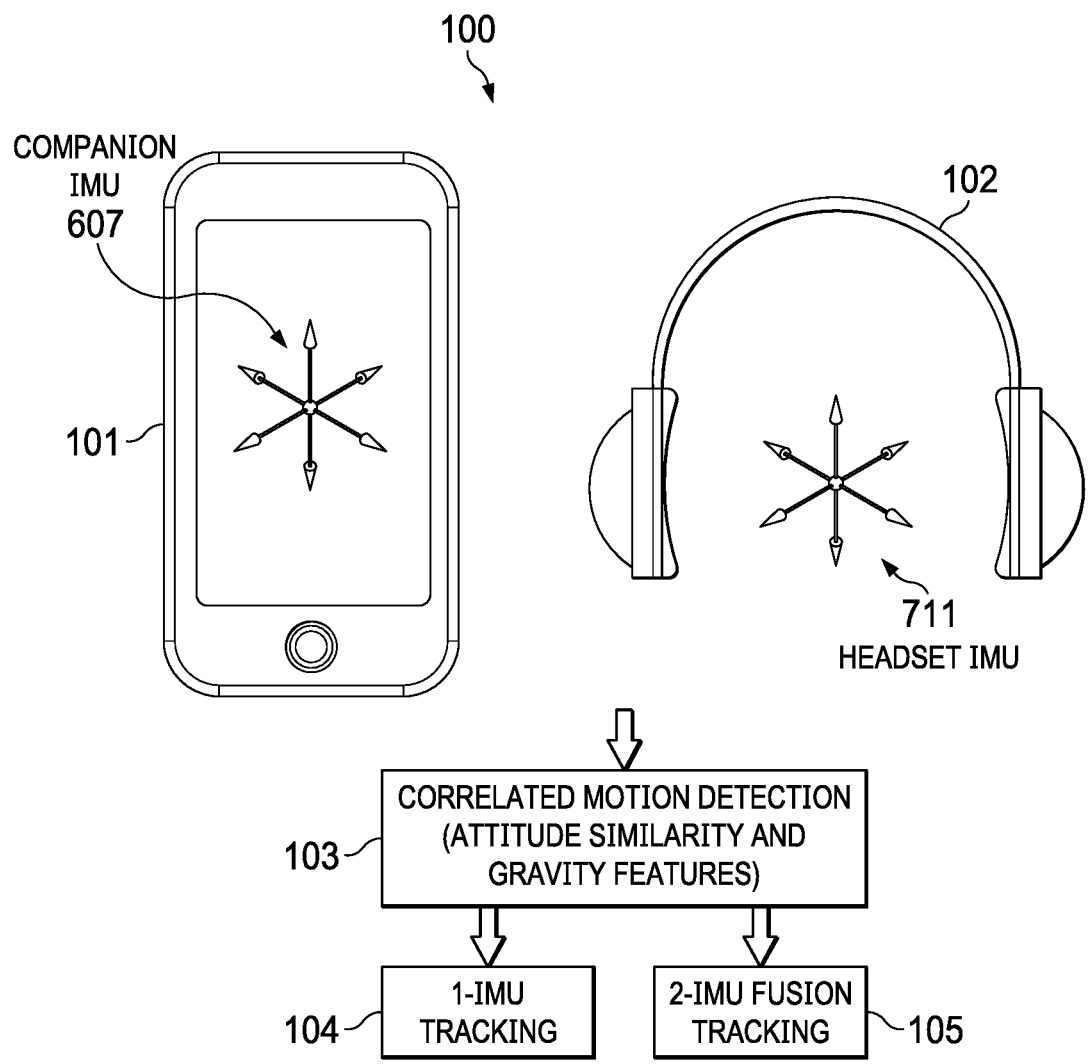
FIG. 1 illustrates an example user posture change scenario, according to an embodiment.

FIG. 1 is a conceptual diagram illustrating the use of correlated motion to select a motion tracking state, according to an embodiment. In the example scenario shown, a user is viewing audio/visual (AV) content displayed on source device 101 while wearing headset 102 that is wired or wirelessly coupled to source device 101.

Source device 103 includes any device capable of playing AV content and can be wired or wirelessly coupled to headset 102, including but not limited to a smartphone, tablet computer, laptop computer, wearable computer, game console, television, etc. In an embodiment, source device 101 includes the architecture 600 described in reference to FIG. 6. The architecture 600 includes inertial measurement unit (IMU) 607 that includes various motion sensors, including but not limited to angular rate sensors (e.g., 3-axis MEMS gyro) and accelerometers (e.g., 3-axis MEMS accelerometer). When source device 103 is moved or rotated, the motion sensors detect the motion. The outputs of IMU 607 are processed into rotation and acceleration data in an inertial reference frame. In an embodiment, source device 101 outputs AV content, including but not limited to augmented reality (AR), virtual reality (VR) and immersive video content. Source device 101 also includes an audio rendering engine (e.g., a binaural rendering engine) that simulates the main audio cues humans use to localize sounds including interaural time differences, interaural level differences, and spectral filtering done by the outer ears.

Headset 102 is any device that includes loudspeakers for projecting acoustic audio, including but not limited to: headsets, earbuds, ear phones and loudspeakers (e.g., smart speakers). In an embodiment, headset 102 includes the architecture 700 described in reference to FIG. 7. The architecture includes IMU 711 that includes various motion sensors, including but not limited to angular rate sensors (e.g., 3-axis MEMS gyro) and accelerometers (e.g., 3-axis MEMS accelerometer). When user 101 translates or rotates her head, the motion sensors in IMU 711 detect the motion. The outputs of the headset motion sensors are processed into rotation and acceleration data in the same inertial reference frame as the rotation and acceleration output by IMU 607 of source device 101.

In an embodiment, the headset motion data is transmitted to source device 101 over a short-range wireless communication channel (e.g., a Bluetooth channel). At source device 101, correlation motion detector 101 determines similarities (e.g., similar attitude and gravity features) between the headset motion data and the source device motion data. If the headset data and source device motion data are determined to not be correlated, a head tracker is transitioned into a 1-IMU tracking state 104, where head tracking is performed using only the headset motion data. If the headset motion data and the source device motion data are determined to be correlated, the head tracker is transitioned into a 2-IMU fusion tracking state 105, where head tracking is performed using relative motion data computed from the headset motion data and source device motion data. In the 2-IMU fusion tracking state 105, the relative position and relative attitude is computed using a relative motion model, as described in Appendix A attached hereto. The estimated relative motion (a boresight vector) is used by a head tracker to track the user's head pose and keep the spatial audio centered and stable with respect to an estimated gravity direction. The boresight vector estimate is updated each time the relative motion changes, and thus may cause the virtual auditory space to become uncentered. Because the estimated boresight vector is subject to drift error, the boresight vector needs to be corrected periodically or in response to trigger event (e.g., a large user posture change), as described in Appendix A.

Figure 2:
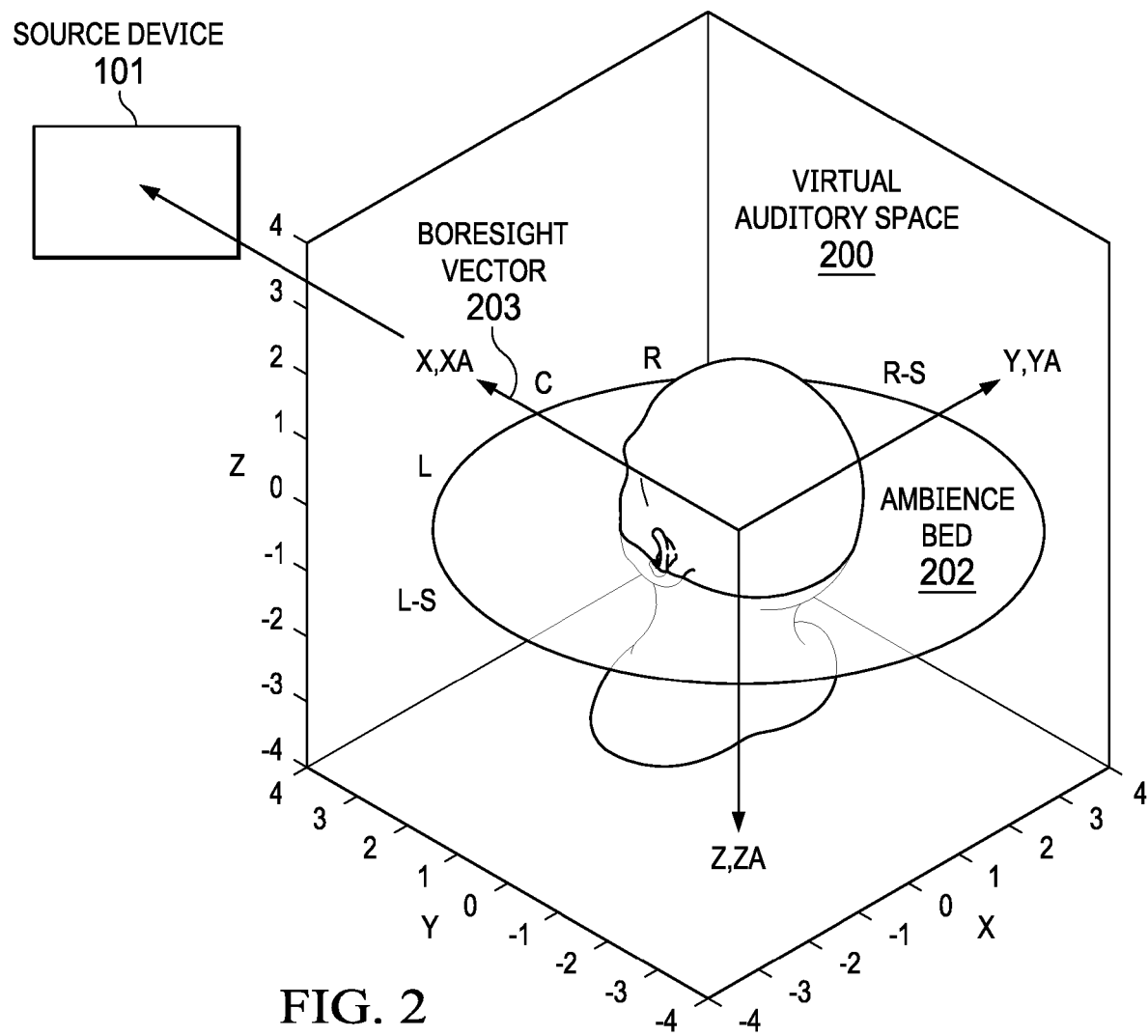
FIG. 2 illustrates a centered and inertially stabilized 3D virtual auditory space, according to an embodiment.

FIG. 2 illustrates a centered and inertially stabilized 3D virtual auditory space 200, according to an embodiment. The virtual auditory space 200 includes virtual sound sources or "virtual speakers" (e.g., center (C), Left (L), Right (R), left-surround (L-S) and right-surround (R-S)) that are rendered in ambience bed 202 using known spatial audio techniques, such as binaural rendering. To maintain the desired 3D spatial audio effect, it is desired that the center channel (C) be aligned with a boresight vector 203. The boresight vector 203 originates from a headset reference frame and terminates at a source device reference frame. When the virtual auditory environment is first initialized, the center channel is aligned with boresight vector 203 by rotating a reference frame for the ambience bed 202 ($X_A$, $Y_A$, $Z_A$) to align the center channel with boresight vector 203, as shown in FIG. 2.

When the spatial audio is centered, the user perceives audio from the center channel (e.g., spoken dialogue) as coming directly from the display of source device 101. The centering is accomplished by tracking boresight vector 203 to the location of source device 101 from the head reference frame using an extended Kalman filter (EKF) tracking system, as described in Appendix A. Estimated boresight vector 203 only determines the location of the center channel. A second tracker takes as input the estimated boresight vector 203 and provides an output orientation of ambience bed 202, which determines the location of the L/L-S and R/R-S surround channels around the user in addition to the center channel. Aligning the center channel of ambience bed 202 with boresight vector 203 allows rendering the center channel at the estimated location of source device 101 for the user's perception.

If boresight vector 203 is not centered on source device 101 (e.g., due to tracking error), then aligning the center channel of ambience bed 202 will not "center" the audio, since the center channel will still be rendered at the erroneous estimate of the location of source device 101. Note that boresight vector 203 changes whenever the user's head rotates with respect to source device 101, such as when source device 101 is stationary in front of the user and the user's head is rotating. In this case, the motion of the user's head is accurately tracked as the head rotates, so that even when boresight vector 203 changes, the audio stays centered on the estimated location of source device 101 because the EKF is providing accurate tracking of how the true boresight vector 203 is changing. Also note that spatial audio becomes uncentered when the estimated boresight vector 203 is not the true location of source device 101 due to tracking error, which may come from drift over time, such as IMU propagation errors from gyro bias, etc., or other sources of error. In an embodiment, the tracking error is corrected using a bleed-to-zero (BTZ) process when the user is quiescent or a complex transition is detected, as described in Appendix A.

Note that ambience bed 202 shown in FIG. 2 is for a 5.1 audio format, where all audio channels are located in an $X_A Y_A$ plane of ambience bed 202 ($Z_A=0$), where $X_A$ is forward towards the center channel, $Y_A$ is right an $Z_A$ is down. Other embodiments can have more or fewer audio channels, and the audio channels can be placed at different locations in the 3D virtual auditory space arbitrarily in any plane.

Figure 3:
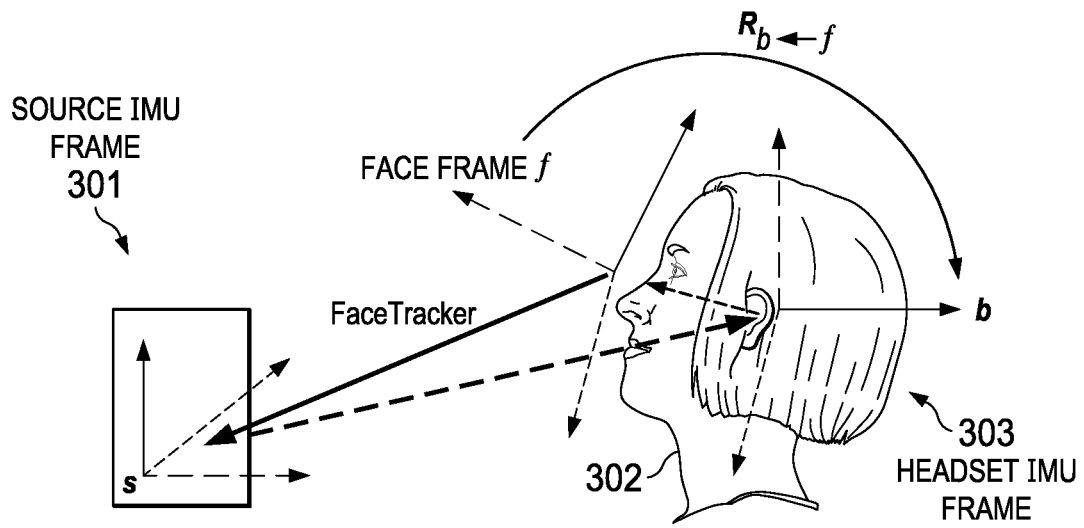
FIG. 3 illustrates the geometry for estimating a head to headset rotation transform auditory space, according to an embodiment.

FIG. 3 is illustrates the geometry for estimating a head to headset rotation transform, according to an embodiment. There are three reference frames shown: a source device IMU reference frame 301 ($s$), a face reference frame 302 ($f$) and headset reference frame 303 ($b$). It is desired to estimate the rotation transform from the face frame to the headset frame, given by $R_{b \leftarrow f}$. It is assumed that the face reference frame is aligned with the head reference frame, where the origin is in the center of the user's head, the X-axis is towards the user's nose, the Y-axis is towards the user's right ear, and the Z-axis is towards the user's chin, as shown in FIG. 2.

Figure 4:
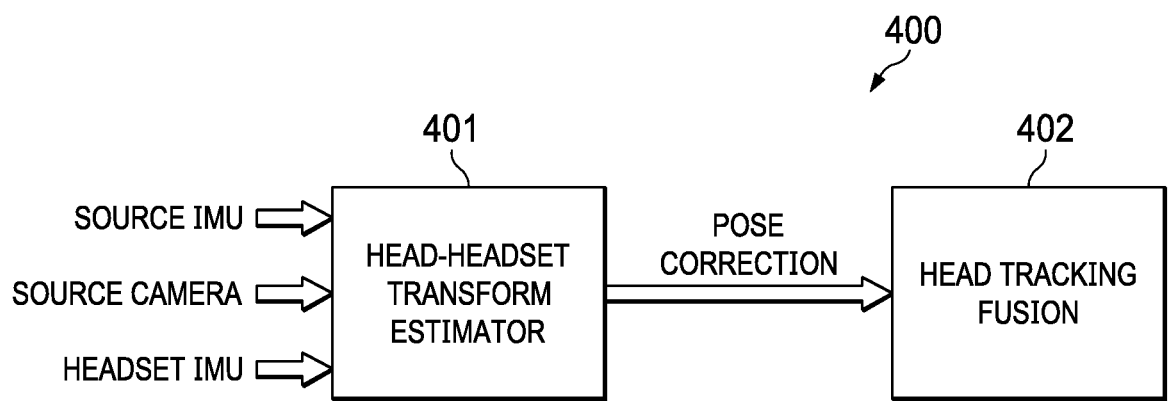
FIG. 4 is a block diagram of a system for estimating a head to headset rotation transform, according to an embodiment.

FIG. 4 is a block diagram of system 400 for estimating a face to headset rotation transform, according to an embodiment. System 400 includes head-headset transform estimator 401 and head tracking fusion model 402. Transform estimator 401 receives as input source device motion data from IMU 607, camera face pose measurements from a face detector and headset motion data from IMU 711. Under an assumption that source device 101 is static, the estimation problem is treated as a hand-eye calibration problem, with the correspondence between a delta camera face pose measurements and a delta (6-axis) attitude from headset IMU 711, generated by two distinct head poses captured at two different times $t_0$ and $t_1$ given by:

$$R'^1_{f \leftarrow c} R_{c \leftarrow i} = R_{f \leftarrow b} R'^1_{b \leftarrow i}, \quad [1]$$

$$R'^1_{f \leftarrow c} R_{c \leftarrow i} = R_{f \leftarrow b} R'^1_{b \leftarrow i}, \quad [2]$$

$$\Delta R_{f \leftarrow c} R_{f \leftarrow b} = R_{f \leftarrow b} \Delta R_{i \leftarrow b}, \quad [3]$$

where $$R'^1_{f \leftarrow c} = \Delta R_{f \leftarrow c} R'^0_{f \leftarrow c}, \, R'^1_{b \leftarrow i} = \Delta R_{b \leftarrow i} R'^0_{b \leftarrow i}.$$

Equations [1]-[3] above gives the canonical hand-eye calibration form AX=XB, where X can be estimated with various methods.

However, the above method requires that the source device is kept static while the user moves her head in a camera view during a calibration phase. To avoid this, source device IMU data can be leveraged, which would allow estimation of $R_{f \leftarrow b}$ with a camera, at least in the tip-tilt direction, without requiring the user to move. More angles can be estimated when either or both source device or headset move. For example, gravity estimates on the two IMUs can be used in the estimation. The estimation of rotation transform $R_{f \leftarrow b}$ can be computed using an extended Kalman filter with the quaternion $q_{f \leftarrow b}$ being the state, and the measurement updates given by:

$$g_i^s = R_{s \leftarrow c} R_{c \leftarrow f} R_{f \leftarrow b} g_i^b, \quad [4]$$

where $g_i^s$ and $g_i^b$ are gravity vectors in the source device and headset frames, respectively, and are observable under quiescent conditions, and $R_{s \leftarrow c}$ and $R_{c \leftarrow f}$ are a transform from camera frame to source frame and a transform from face frame to camera frame, respectively. Alternatively, gravity estimates from 6-axis delta measurements from the source device and headset IMUs can be used. The measurement updates and the Kalman matrices are described more fully in Appendix A. After the rotation transform $R_{f \leftarrow b}$ is estimated using Equation [4] it is input into head tracking fusion model 402 for estimating the boresight, as described in reference to FIG. 2.

Figure 5:
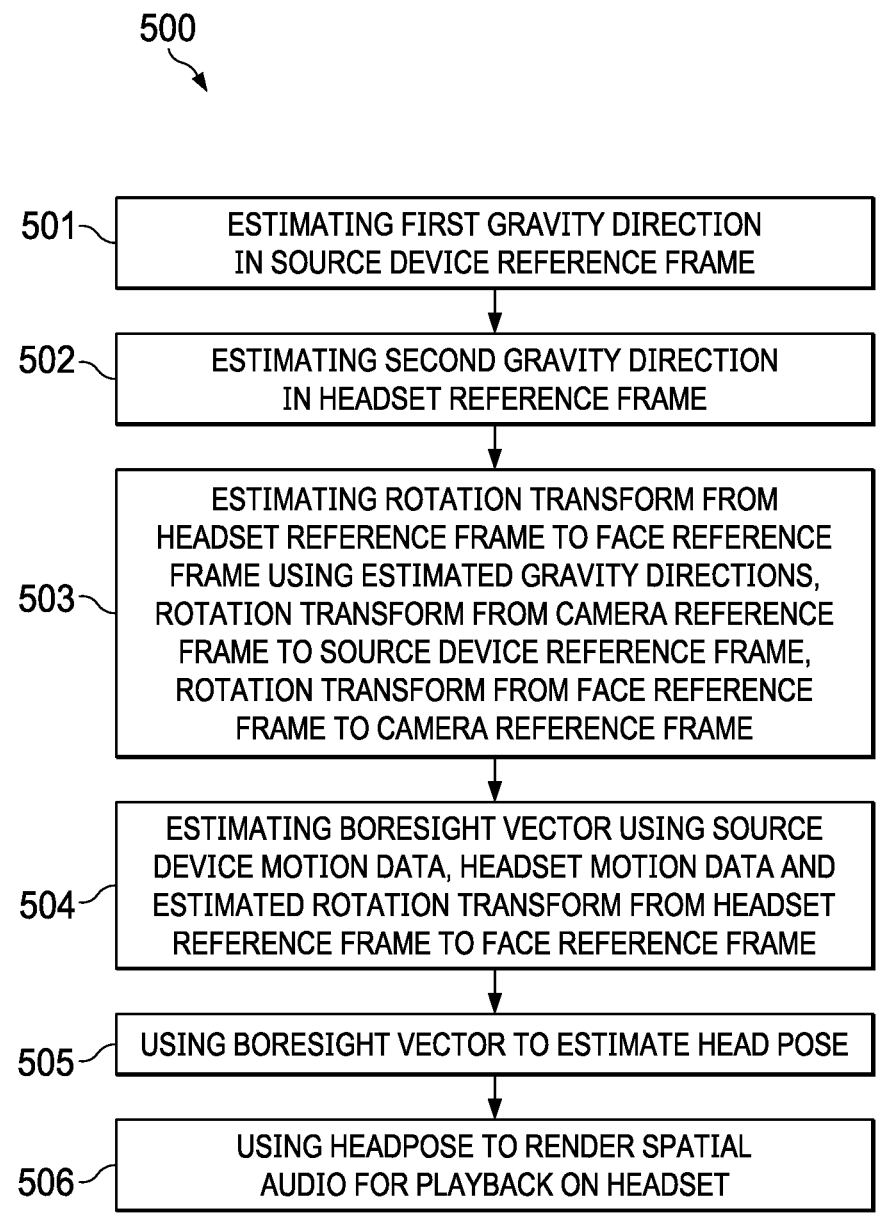
FIG. 5 is a flow diagram of process of estimating a head to headset rotation transform, according to an embodiment.

FIG. 5 is a flow diagram of process 500 of estimating a head to headset rotation transform. Process 500 can be implemented using, for example, the source device architecture shown in FIG. 6.

Process 500 begins by estimating a first gravity direction in source device reference frame (501), estimating a second gravity direction in a headset reference frame (502), estimating a rotation transform from the headset frame into a face reference frame using the first and second estimated gravity directions, a rotation transform from a camera reference frame to the source device reference frame, and a rotation transform from the face reference frame to the camera reference frame (503), estimating a boresight vector using source device motion data, headset motion data and the rotation transform from the headset frame to the face reference frame (504), using the estimated boresight vector to estimate a user's head pose (505), and using the estimated head pose to render spatial audio for playback on the headset (506).

Example Software/Hardware Architectures

Figure 6:
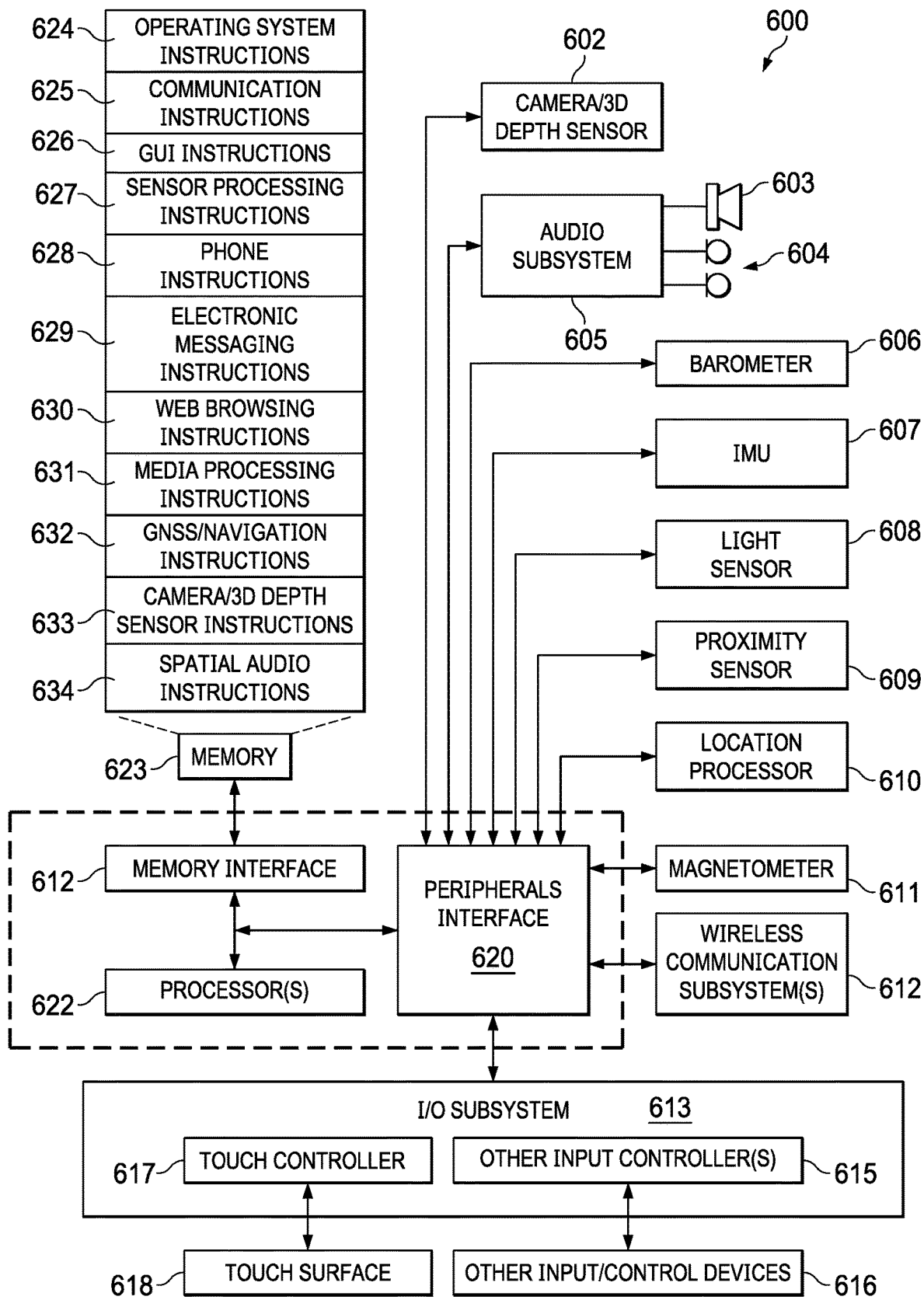
FIG. 6 a conceptual block diagram of a source device software/hardware architecture implementing the features and operations described in reference to FIGS. 1-5.

FIG. 6 a conceptual block diagram of source device software/hardware architecture 600 implementing the features and operations described in reference to FIGS. 1-5. Architecture 600 can include memory interface 621, one or more data processors, digital signal processors (DSPs), image processors and/or central processing units (CPUs) 622 and peripherals interface 620. Memory interface 621, one or more processors 622 and/or peripherals interface 620 can be separate components or can be integrated in one or more integrated circuits.

Sensors, devices and subsystems can be coupled to peripherals interface 620 to provide multiple functionalities. For example, IMU 607, light sensor 608 and proximity sensor 609 can be coupled to peripherals interface 620 to facilitate motion sensing (e.g., acceleration, rotation rates), lighting and proximity functions of the wearable computer. Location processor 610 can be connected to peripherals interface 620 to provide geo-positioning. In some implementations, location processor 610 can be a GNSS receiver, such as the Global Positioning System (GPS) receiver. Electronic magnetometer 611 (e.g., an integrated circuit chip) can also be connected to peripherals interface 620 to provide data that can be used to determine the direction of magnetic North. Electronic magnetometer 611 can provide data to an electronic compass application. IMU 607 can include one or more accelerometers and/or gyros (e.g., 3-axis MEMS accelerometer and 3-axis MEMS gyro) configured to determine change of speed and direction of movement of the source device. Barometer 606 can be configured to measure atmospheric pressure around the mobile device.

Camera/3D depth sensor 602 captures digital images and video and can include both forward-facing and rear-facing cameras. The 3D depth sensor can be any sensor capable of capturing 3D data or point clouds, such as a time of flight (TOF) sensor or LiDAR.

Communication functions can be facilitated through wireless communication subsystems 612, which can include radio frequency (RF) receivers and transmitters (or transceivers) and/or optical (e.g., infrared) receivers and transmitters. The specific design and implementation of the wireless communication subsystem 612 can depend on the communication network(s) over which a mobile device is intended to operate. For example, architecture 600 can include communication subsystems 612 designed to operate over a GSM network, a GPRS network, an EDGE network, a Wi-Fi™ network and a Bluetooth™ network. In particular, the wireless communication subsystems 612 can include hosting protocols, such that the mobile device can be configured as a base station for other wireless devices.

Audio subsystem 605 can be coupled to a speaker 603 and one or more microphones 604 to facilitate voice-enabled functions, such as voice recognition, voice replication, digital recording and telephony functions. Audio subsystem 605 can be configured to receive voice commands from the user.

I/O subsystem 613 can include touch surface controller 617 and/or other input controller(s) 615. Touch surface controller 617 can be coupled to a touch surface 618. Touch surface 618 and touch surface controller 617 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 646. Touch surface 618 can include, for example, a touch screen or the digital crown of a smart watch. I/O subsystem 613 can include a haptic engine or device for providing haptic feedback (e.g., vibration) in response to commands from processor or a digital signal processor (DSP) 622. In an embodiment, touch surface 618 can be a pressure-sensitive surface.

Other input controller(s) 615 can be coupled to other input/control devices 616, such as one or more buttons, rocker switches, thumb-wheel, infrared port and USB port. The one or more buttons (not shown) can include an up/down button for volume control of speaker 603 and/or microphones 604. Touch surface 618 or other input control devices 616 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 618; and a pressing of the button for a second duration that is longer than the first duration may turn power to the mobile device on or off. The user may be able to customize a functionality of one or more of the buttons. The touch surface 618 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 621 can be coupled to memory 623. Memory 623 can include high-speed random access memory and/or non-volatile memory, such as one or more magnetic disk storage devices, one or more optical storage devices and/or flash memory (e.g., NAND, NOR). Memory 623 can store operating system 624, such as the iOS operating system developed by Apple Inc. of Cupertino, Calif. Operating system 624 may include instructions for handling basic system services and for performing hardware dependent tasks. In some implementations, operating system 624 can include a kernel (e.g., UNIX kernel).

Memory 623 may also store communication instructions 625 to facilitate communicating with one or more additional devices, one or more computers and/or one or more servers, such as, for example, instructions for implementing a software stack for wired or wireless communications with other devices. Memory 623 may include graphical user interface instructions 626 to facilitate graphic user interface processing; sensor processing instructions 627 to facilitate sensor-related processing and functions; phone instructions 628 to facilitate phone-related processes and functions; electronic messaging instructions 629 to facilitate electronic-messaging related processes and functions; web browsing instructions 630 to facilitate web browsing-related processes and functions; media processing instructions 631 to facilitate media processing-related processes and functions; GNSS/Location instructions 632 to facilitate generic GNSS and location-related processes; and camera/3D depth sensor instructions 633 for capturing images (e.g., video, still images) and depth data (e.g., a point cloud). Memory 623 further includes spatial audio instructions 634 for use in spatial audio applications, including but not limited AR and immersive video applications.

Each of the above identified instructions and applications can correspond to a set of instructions for performing one or more functions described above. These instructions need not be implemented as separate software programs, procedures, or modules. Memory 623 can include additional instructions or fewer instructions. Furthermore, various functions of the mobile device may be implemented in hardware and/or in software, including in one or more signal processing and/or application specific integrated circuits.

Figure 7:
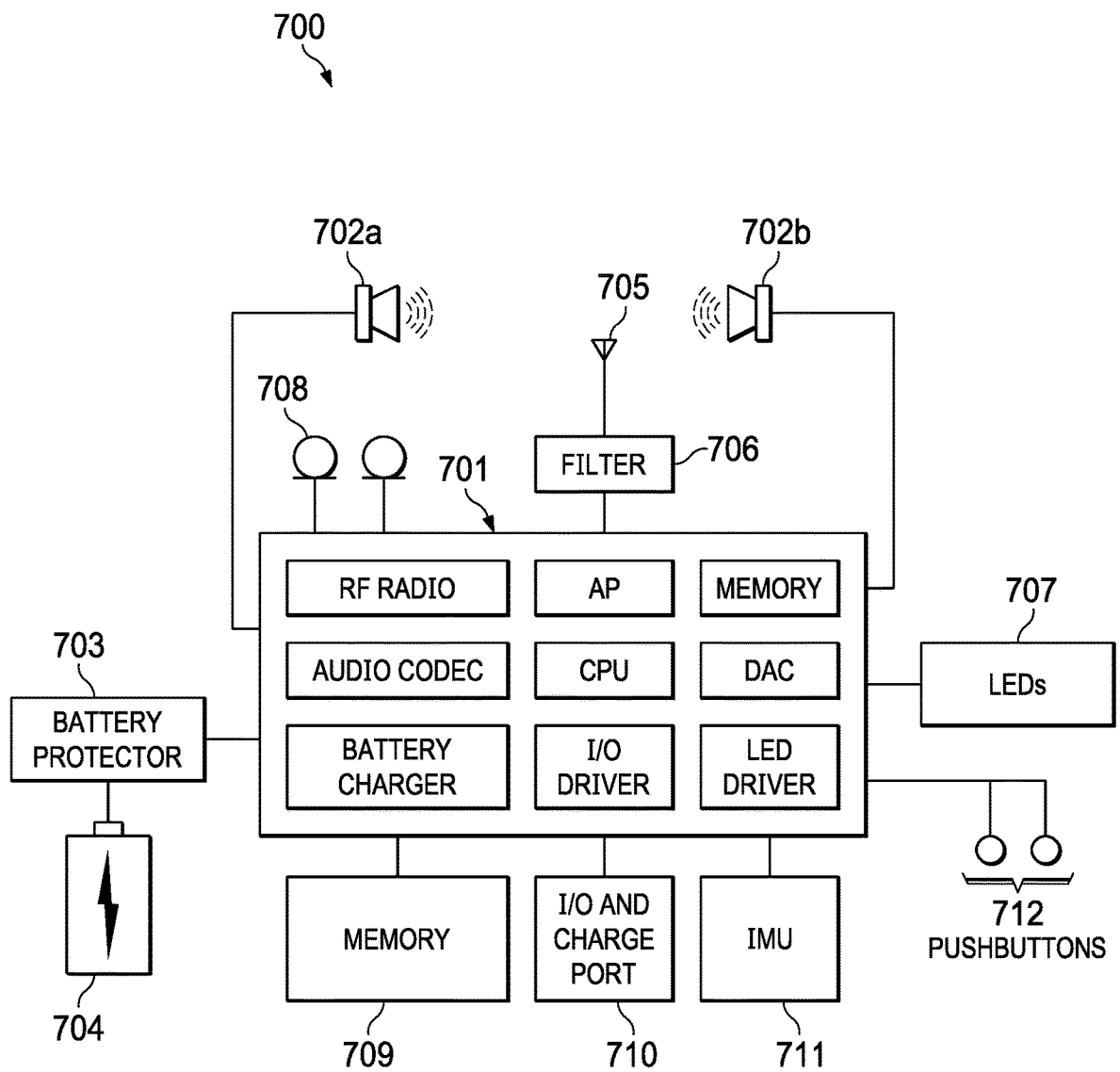
FIG. 7 a conceptual block diagram of a headset software/hardware architecture implementing the features and operations described in reference to FIGS. 1-5.

FIG. 7 is a conceptual block diagram of headset software/hardware architecture 700 implementing the features and operations described in reference to FIGS. 1-5. In an embodiment, architecture 700 can includes system-on-chip (SoC) 701, stereo loudspeakers 702a, 702b (e.g., ear buds, headphones, ear phones), battery protector 703, rechargeable battery 704, antenna 705, filter 706, LEDs 707, microphones 708, memory 709 (e.g., flash memory), I/O/Charge port 710, IMU 711 and pushbuttons 712 for turning the headset on and off, adjusting volume, muting, etc. IMU 711 was previously described in reference to FIGS. 1-5, and includes, for example, a 3-axis MEMS gyro and a 3-axis MEMS accelerometer.

SoC 701 further includes various modules, such as a radio frequency (RF) radio (wireless transceiver) for wireless bi-directional communication with other devices, such as a source device 103, as described in reference to FIGS. 1-5. SoC 701 further includes an application processor (AP) for running specific applications, memory (e.g., flash memory), central processing unit (CPU) for managing various functions of the headsets, audio codec for encoding/decoding audio, battery charger for charging/recharging rechargeable battery 704, I/O driver for driving I/O and charge port 710 (e.g., a micro USB port), digital to analog converter (DAC) converting digital audio into analog audio and LED driver for driving LEDs 707. Other embodiments can have more or fewer components.

Figure 8:
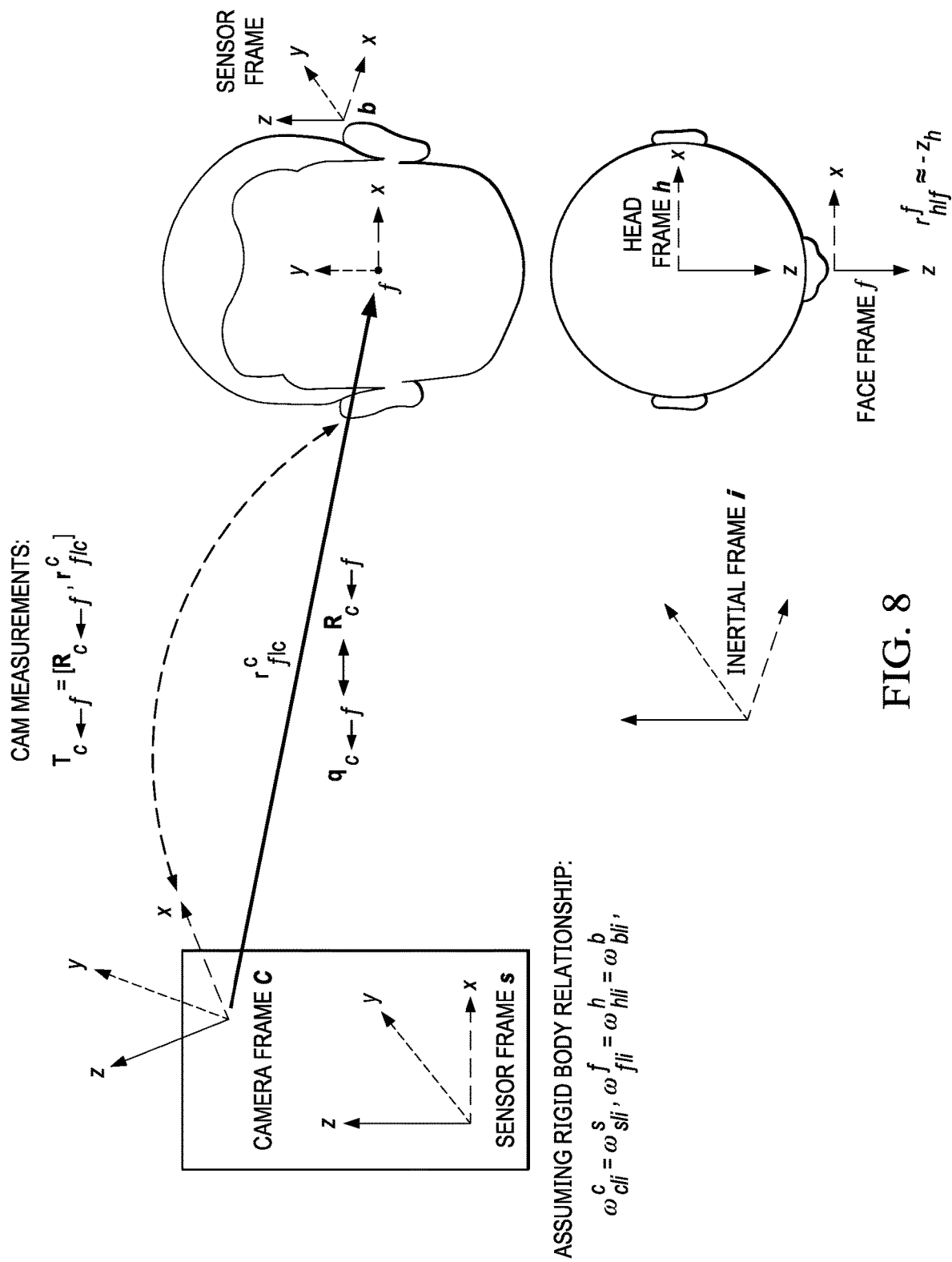
FIG. 8 illustrates various reference frames and notation for relative pose tracking, according to an embodiment.

FIG. 8 illustrates various reference frames and notation for relative pose tracking, according to an embodiment, as described more fully in Appendix A attached hereto.

Figure 9:
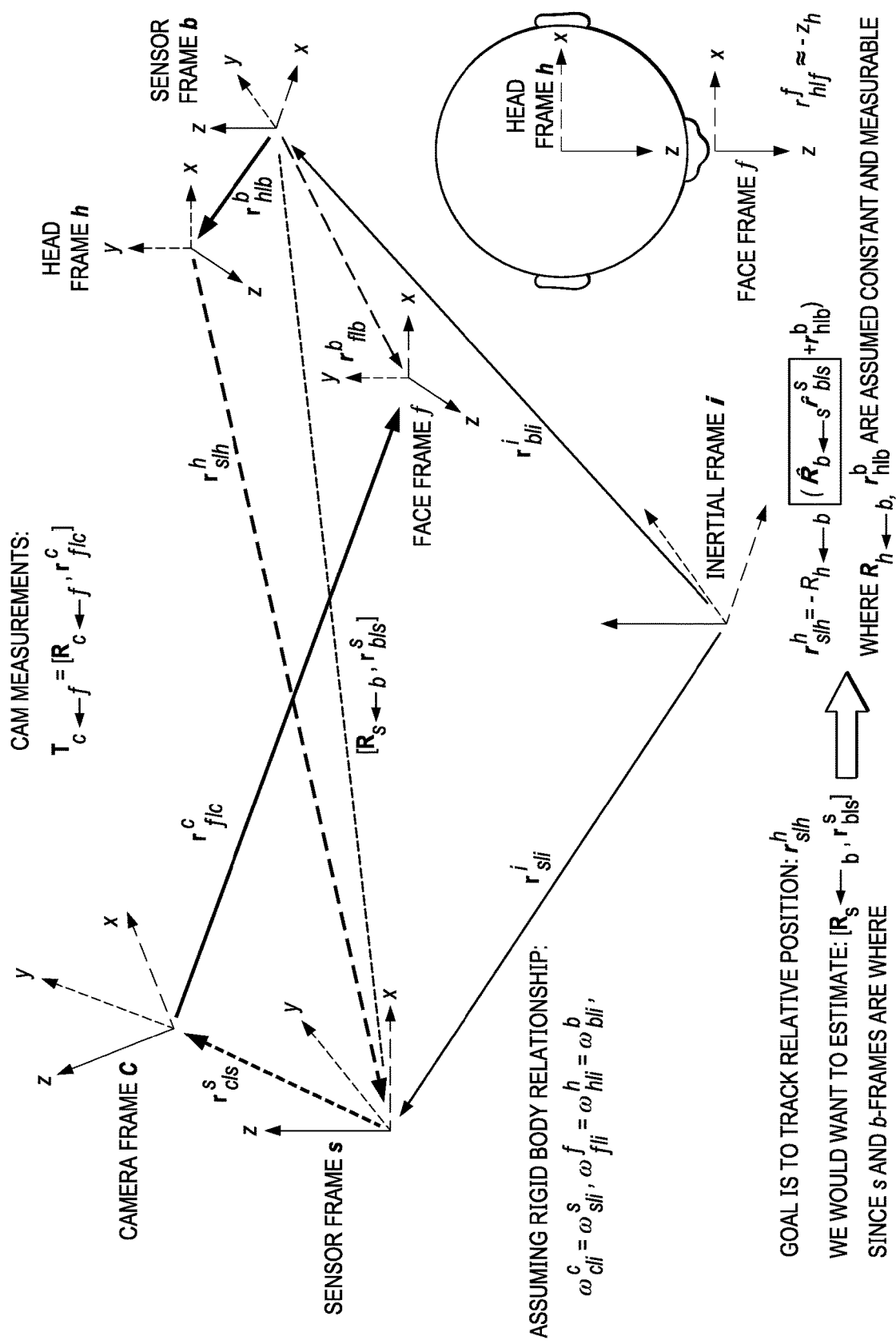
FIG. 9 illustrates the geometry for a relative motion model used in headtracking, according to an embodiment.

FIG. 9 illustrates the geometry for a relative motion model used in headtracking, according to an embodiment, as described more fully in Appendix A attached hereto The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
    estimating a first gravity direction in a source device reference frame for a source device;
    estimating a second gravity direction in a headset reference frame for a headset;
    estimating a first rotation transform from the headset reference frame into a face reference frame using the first and second estimated gravity directions, a second rotation transform from a camera reference frame to the source device reference frame, and a third rotation transform from the face reference frame to the camera reference frame;
    estimating a relative position and attitude using source device motion data, headset motion data and the first rotation transform from the headset reference frame to the face reference frame;
    using the relative position and attitude to estimate a head pose; and
    using the estimated head pose to render spatial audio for playback on the headset.

2. The method of claim 1, wherein the first rotation transform is estimated using a first Kalman filter.

3. The method of claim 1, wherein estimating the head pose includes estimating a boresight vector that originates from the headset reference frame and terminates at the source device reference frame.

4. The method of claim 3, further comprising:
    generating an ambience bed orientation that determines a location of at least surround channels and a center channel in a three-dimensional (3D) virtual auditory space based on the estimated boresight vector.

5. The method of claim 1, wherein the headset motion data is transmitted from the headset to the source device over a short-range wireless communication channel.

6. The method of claim 1, wherein the source device is a computer with a display, a front-facing camera, and face tracker configured to generate the second rotation transform based on camera images of a user's face captured by the front-facing camera.

7. The method of claim 1, wherein the first rotation transform, is computed using an extended Kalman filter with a quaternion, being the state, and update measurements are given by:

$$g_i^s = R_{s \leftarrow c} R_{c \leftarrow f} R_{f \leftarrow b} g_i^b,$$

where $g_i^s$ and $g_i^b$ are the first and second gravity vectors, respectively, and are observable under quiescent conditions when the source device and headset are not moving, and $R_{s \leftarrow c}$ and $R_{c \leftarrow f}$ are the second rotation transform from the camera reference frame to the source device reference frame and the third rotation transform from the face reference frame to the camera reference frame, respectively.

8. A system comprising:
    a source device including a first motion sensor and a camera, the first motion sensor and camera configured to capture source device motion data and face pose measurements, respectively;
    a headset including a second motion sensor configured to capture headset motion data;
    a head-headset transform estimator configured to:
        estimate a first gravity direction in a source device reference frame for the source device;
        estimate a second gravity direction in a headset reference frame for the headset;
        estimate a first rotation transform from the headset reference frame into a face reference frame using the first and second estimated gravity directions, a second rotation transform from a camera reference frame to the source device reference frame, and a third rotation transform from the face reference frame to the camera reference frame;
        estimate a relative position and attitude between the source device and the headset using the source device motion data, the headset motion data and the first rotation transform from the headset frame to the face reference frame;
        estimate a head pose based on the relative position and attitude; and
    an audio render configured to render spatial audio for playback on the headset based on the estimated head pose.

9. The system of claim 8, wherein the first rotation transform is estimated using a Kalman filter.

10. The system of claim 8, wherein estimating the head pose includes estimating a boresight vector that originates from a headset reference frame and terminates at the source device reference frame.

11. The system of claim 10, further comprising:
generating an ambience bed orientation that determines a location of at least surround channels and a center channel in a three-dimensional (3D) virtual auditory space based on the estimated boresight vector.

12. The system of claim 8, wherein the headset motion data is transmitted from the headset to the source device over a short-range wireless communication channel.

13. The system of claim 8, wherein the source device is a computer with a display, a front-facing camera, and face tracker configured to generate the second rotation transform based on camera images of a user's face captured by the front-facing camera.

14. The system of claim 8, wherein the first rotation transform, $R_{f \leftarrow b}$, is computed using an Extended Kalman Filter with a relative attitude quaternion, $q_{f \leftarrow b}$ being the state, and update measurements to state prediction are given by:

where and s are the first and second gravity vectors, respectively, and are observable under quiescent conditions when the source device and headset are not moving, and $R_{s \leftarrow c}$ and $R_{c \leftarrow f}$ are the second rotation transform from camera reference frame to source device reference frame and the third rotation transform from the face reference frame to camera reference frame, respectively.

* * * * *

UNITED STATES PATENT AND TRADEMARK OFFICE
CERTIFICATE OF CORRECTION

PATENT NO. : 11,647,352 B2
APPLICATION NO. : 17/349907
DATED : May 9, 2023
INVENTOR(S) : Margaret H. Tam et al.

It is certified that error appears in the above-identified patent and that said Letters Patent is hereby corrected as shown below:

In the Claims

Column 10, Line 21, in Claim 7, after "transform," insert -- $R_{f \leftarrow b}$, --;

Column 10, Line 22, in Claim 7, after "quaternion," insert -- $q_{f \leftarrow b}$, --;

Column 11, Line 16, in Claim 14, delete "$q_{f \leftarrow b}$" and insert -- $q_{f \leftarrow b}$, --;

Column 11, Line 18, in Claim 14, below "by:" insert -- $g\frac{s}{i} = R_{s \leftarrow c} R_{c \leftarrow f} R_{f \leftarrow b} g\frac{b}{i}$, --; and Column 11, Line 19, in Claim 14, delete "ands" and insert -- $g\frac{s}{i}$ and $g\frac{b}{i}$ --.

Signed and Sealed this
Twenty-fourth Day of October, 2023

Katherine Kelly Vidal
*Director of the United States Patent and Trademark Office*